(12) United States Patent
Yamamura et al.

(10) Patent No.: US 8,169,092 B2
(45) Date of Patent: May 1, 2012

(54) COGENERATION SYSTEM

(75) Inventors: Yoichi Yamamura, Saitama (JP); Hiroyuki Eguchi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 571 days.

(21) Appl. No.: 12/321,517

(22) Filed: Jan. 22, 2009

(65) Prior Publication Data
US 2009/0206599 A1 Aug. 20, 2009

(30) Foreign Application Priority Data
Feb. 15, 2008 (JP) ................................. 2008-034508

(51) Int. Cl.
*F02B 67/00* (2006.01)

(52) U.S. Cl. .............................................. 290/2; 60/698

(58) Field of Classification Search ................. 290/2, 41; 60/597, 616
See application file for complete search history.

(56) References Cited

U.S. PATENT DOCUMENTS

| | | | |
|---|---|---|---|
| 6,966,185 B2 * | 11/2005 | Shimada et al. | 60/698 |
| 7,127,896 B2 * | 10/2006 | Shimada et al. | 60/698 |
| 7,239,034 B2 * | 7/2007 | Gehret, Jr. | 290/40 B |
| 7,245,035 B2 * | 7/2007 | Anzioso et al. | 290/2 |
| 7,629,701 B2 * | 12/2009 | Campanile et al. | 290/2 |
| 2008/0036211 A1 * | 2/2008 | Lee et al. | 290/2 |

FOREIGN PATENT DOCUMENTS

JP 08-004586 1/1996

* cited by examiner

*Primary Examiner* — Michael Zarroli
(74) *Attorney, Agent, or Firm* — Carrier Blackman & Associates, P.C.; Joseph P. Carrier; William D. Blackman

(57) ABSTRACT

In a cogeneration system having a generator adapted to be connectable to an AC power feed line between a commercial power network and an electrical load, an internal combustion engine for driving the generator such that exhaust heat of the engine is supplied to a thermal load and an actuator that opens and closes a throttle valve of the engine, there are provided a power demand detector that detects power demand of the electrical load, a thermal demand detector that detects thermal demand of the thermal load. The operation of the actuator is controlled in response to the detected power demand so as to increase or decrease the engine, and ignition timing of the engine is controlled in a retard direction in response to the detected thermal demand.

12 Claims, 3 Drawing Sheets

COGENERATION SYSTEM

BACKGROUND OF THE INVENTION

1. Field of the Invention

This invention relates to a cogeneration system, and particularly to a cogeneration system having an improved operation efficiency.

2. Description of the Related Art

In recent years, cogeneration systems have been developed that are equipped with an internal combustion engine-driven generator for installation in an AC power supply line between a commercial power network and an electrical load for supplying or outputting power to the load in interconnection with the power network and also for supplying hot water or the like heated by the exhaust heat (thermal output) from the engine to a thermal load.

Generally, such a cogeneration system is operated with focus on electricity (rather than heat) in which electric power is generated in response to power demand in an electrical load and thermal output generated with the power generation is utilized as much as possible, while surplus thermal output is radiated (released), or is operated with focus on heat (rather than electricity) in which electric power is generated so as to output exhaust heat in response to thermal demand in a thermal load.

Therefore, when the power demand is kept constant, but the thermal demand is increased, since an amount of generated power remains unchanged in the electricity-focused operation, it results in shortage of the thermal output. On the other hand, in the heat-focused operation, since power generation is increased with increasing thermal output, it results in surplus electricity.

For that reason, in a technique taught by Japanese Laid-Open Patent Application No. Hei 8(1996)-4586, when surplus electricity is generated, the surplus electricity is supplied to a heater installed in a water storage tank to heat the water, i.e., the surplus electricity generated by a generator is stored as thermal energy for improving energy-saving efficiency.

However, the technique mentioned in the reference is intended to merely efficiently use the surplus electricity and is not for reducing the surplus electricity itself. Specifically, since the surplus electricity or surplus thermal output lowers operation efficiency of the entire cogeneration system, it is preferable not to generate the surplus electricity or thermal output. Nevertheless, due to change in demand, the electricity-focused operation or heat-focused operation inevitably produces the surplus electricity or thermal output.

SUMMARY OF THE INVENTION

An object of this invention is therefore to overcome the foregoing problem by providing a cogeneration system that suppresses generation of surplus electricity or thermal output so as to improve operation efficiency.

In order to achieve the object, this invention provides a cogeneration system having a generator adapted to be connectable to an AC power feed line between a commercial power network and an electrical load, an internal combustion engine for driving the generator such that exhaust heat of the engine is supplied to a thermal load and an actuator that opens and closes a throttle valve of the engine, comprising: a power demand detector that detects power demand of the electrical load; a thermal demand detector that detects thermal demand of the thermal load; an engine speed controller that controls operation of the actuator in response to the detected power demand so as to control speed of the engine; and an ignition timing controller that controls ignition timing of the engine in response to the detected thermal demand.

BRIEF DESCRIPTION OF THE DRAWINGS

The above and other objects and advantages of the invention will be more apparent from the following description and drawings in which.

DETAILED DESCRIPTION OF THE PREFERRED EMBODIMENT

A cogeneration system according to an embodiment of the invention will now be explained with reference to the attached drawings.

Figure 1:
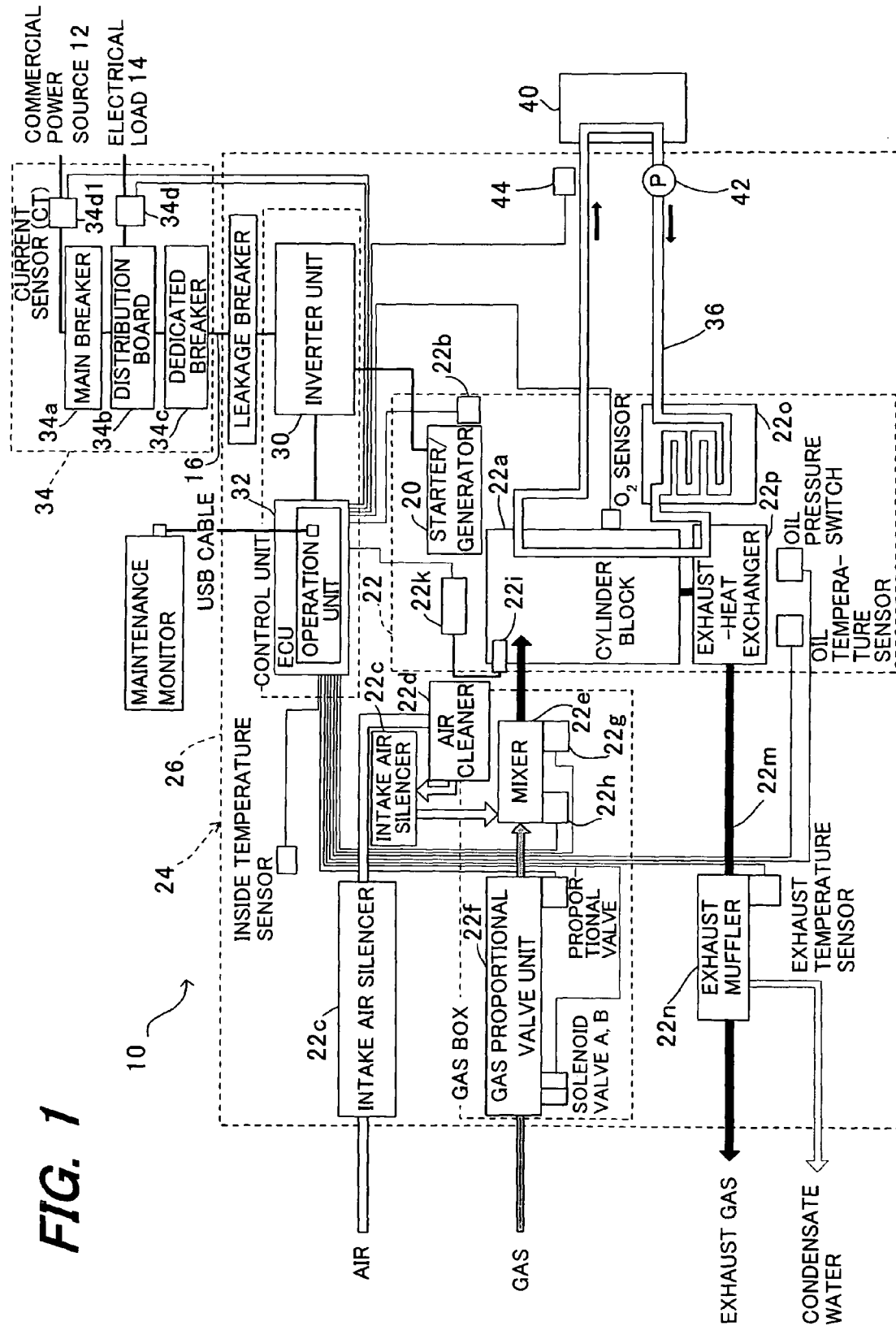
FIG. 1 is a block diagram giving an overall view of a cogeneration system according to an embodiment of this invention.

FIG. 1 is a block diagram giving an overall view of a cogeneration system according to an embodiment of this invention.

In FIG. 1, reference numeral 10 designates the cogeneration system. The cogeneration system 10 is equipped with a power generation unit 24 having a generator 20 connectable to an AC power feed line (power line) 16 between a commercial power source (commercial power network) 12 and electrical load 14, and an internal combustion engine (hereinafter called "engine") 22 driving the generator 20. The power source 12 outputs single-phase, three-wire, 100/200 V, 50 Hz (or 60 Hz) AC power. The generation unit 24 is made integral and housed in a generation unit case 26.

Explaining elements constituting the generation unit 24, the engine 22 is a single-cylinder, four-cycle, water-cooled, spark-ignition, OHV engine that runs on the city gas or LP (liquefied petroleum) gas (hereinafter simply called "gas") and has a displacement of, for example, 163 cc.

The cylinder head (not shown) and cylinder block 22a of the engine 22 are laid in the horizontal (lateral) direction in the generation unit case 26, and a piston is reciprocatingly accommodated therein. The piston is connected to the crankshaft (not shown) laid in the vertical (longitudinal) direction.

A flywheel (not shown) attached to the upper end of the crankshaft has magnet pieces on the inside surface that are arranged to face multipolar coils constituting the generator 20. The generator 20 produces alternating current when the flywheel rotates such that the multipolar coils cross the flux emitted from the magnet pieces. The power output (rated output) of the generator 20 is 1.0 kW or thereabout.

Since the generator 20 functions also as a starter motor for cranking the engine 22 when supplied with power from the power source 12 (or a battery which is not shown), it is indicated as the "starter/generator" in FIG. 1. A pulsar coil 22b is installed in the outside of the flywheel and produces a pulse signal at every predetermined crank angle, e.g., 30 degrees.

In the engine 22, air (intake air) flows into a mixer 22e through an intake air silencer 22c and air cleaner 22d. The mixer 22e is supplied with gas from a fuel supply source through a gas proportional valve unit 22f to mix with air. The mixer 22e and gas proportional valve unit 22f constitute a gas box. The mixer 22e includes an electric throttle motor (actuator) 22g that opens and closes a throttle valve (not shown) of the engine 22 and an electric jet-needle motor 22h that drives a jet needle (not shown) used to regulate an amount of gas (fuel) to be supplied to the engine 22.

The air-fuel mixture produced in the mixer 22e flows into a combustion chamber (not shown). An ignition plug 22i installed near the combustion chamber generates spark discharge between electrodes which face the combustion chamber to ignite and burn the air-fuel mixture when being supplied with an output of a battery (not shown) through an ignition device 22k having a power transistor, ignition coil and the like. The exhaust gas thus generated is discharged to the exterior of the generation unit case 26 through an exhaust pipe 22m and exhaust muffler 22n.

An oil tank or oil pan 22o is formed below the cylinder block 22a of the engine 22 (the crank case is not illustrated) for retaining lubricant oil of the engine 22. The lubricant oil is pumped up by a gear pump (not shown) to lubricate a sliding portion of the piston or the like, and comes down along a connecting rod (not shown) or wall surface of the cylinder to be retained in the oil tank 22o.

The output of the generator or starter/generator 20 is sent to an inverter unit 30 where it is inverted to 100/200 V AC power (single phase) through a DC-DC converter and the like. Together with an electronic control unit (ECU) 32 constituted as a microcomputer having a CPU, ROM, RAM and counter, the inverter unit 30 makes up a control unit and switches the function of the generator 20 between the starter and the generator upon receipt of a command from the ECU 32.

The output of the inverter unit 30 is sent to an indoor switchboard 34. The switchboard 34 includes a main breaker 34a that prevents overcurrent and the like, a distribution board 34b that adds power from the power source 12 to the output of the inverter unit 30 and supplies it to the electrical load 14, a dedicated breaker 34c applied for the generation unit 24, a current sensor 34d that is installed in the power feed line 16 between the distribution board 34b and the electrical load 14 to produce an output or signal indicative of AC power current flowing therethrough, and other elements. Specifically, the output of the inverter unit 30 is combined with the power from the power source 12 in the switchboard 34 and supplied to the electrical load 14.

Reference numeral 36 designates a passage of coolant composed of antifreeze liquid for cooling the engine 22. The coolant passage 36 passes through the cylinder block 22a and oil tank 22o of the engine 22 and then is connected to a hot water tank (thermal load) 40.

Specifically, the coolant at low temperature is pumped by a pump 42 from the hot water tank 40, flows through a tank passage formed in the oil tank 22o to heat-exchange with the lubricant oil to cool down the oil and then is warmed up by heat exchange with exhaust gas in an exhaust-heat exchanger 22p installed at the exhaust pipe 22m. The exhaust-heat exchanger 22p has a structure of covering the exhaust pipe 22m with its shape of, for example, deformation of the coolant passage 36.

The coolant passes through a cylinder passage formed in the cylinder block 22a (and the cylinder head) to heat-exchange with the engine 22 for cooling the engine 22. The coolant which became hot by being warmed up by the heat exchange with the exhaust gas and the engine 22 returns to the hot water tank 40 where it warms up retained water to make hot water.

The hot water in the hot water tank 40 is supplied to hot-water supply equipment, heating equipment (neither shown) and the like. Thus the cogeneration system 10 supplies the exhaust heat of the engine 22 to the hot water tank (thermal load) 40, the thermal output (rated output) of which is 2.8 kW or thereabout.

A coolant temperature sensor 44 is disposed near the coolant passage 36, precisely in the vicinity of the hot water tank 40 and near a certain location of the coolant passage 36 where the coolant at high temperature flows, and produces an output or signal indicative of temperature of the coolant flowing therethrough.

The outputs of the above-mentioned pulsar coil 22b, current sensor 34d, 34d1, coolant temperature sensor 44 and the like are inputted to the ECU 32. The ECU 32 counts the outputs, i.e., pulsar signals of the pulsar coil 22b to detect or calculate the engine speed NE and based on the output of the pulsar coil 22b, controls ignition timing of the ignition device 22k.

The ECU 32 also detects or calculates electric power demand of the electrical load 14 based on the output of the current sensor 34d, i.e., a value of AC power current flowing through the power feed line 16 to the electrical load 14. Further the ECU 32 detects or calculates thermal demand of the thermal load (hot water tank 40) by transforming the output of the coolant temperature sensor 44, i.e., the coolant temperature.

The ECU 32 controls the throttle motor 22g in response to the detected power demand or the like, thereby regulating opening of the throttle valve. Further, in response to the detected thermal demand, the ECU 32 controls the ignition timing of the engine 22 through the ignition device 22k, while controlling and driving the jet-needle motor 22h to regulate the gas (fuel) amount.

As shown in FIG. 1, the generation unit 24 is equipped with, in addition to the foregoing sensors, various sensors and based on outputs of those sensors, the ECU 32 controls the operation of the engine 22 and other components, but they will not be explained in detail here, since it is not directly related to the gist of this invention.

Next, control of the operation of the engine 22, specifically control of the operation of the throttle motor 22 and other components will be explained with reference to FIG. 2 onward.

Figure 2:
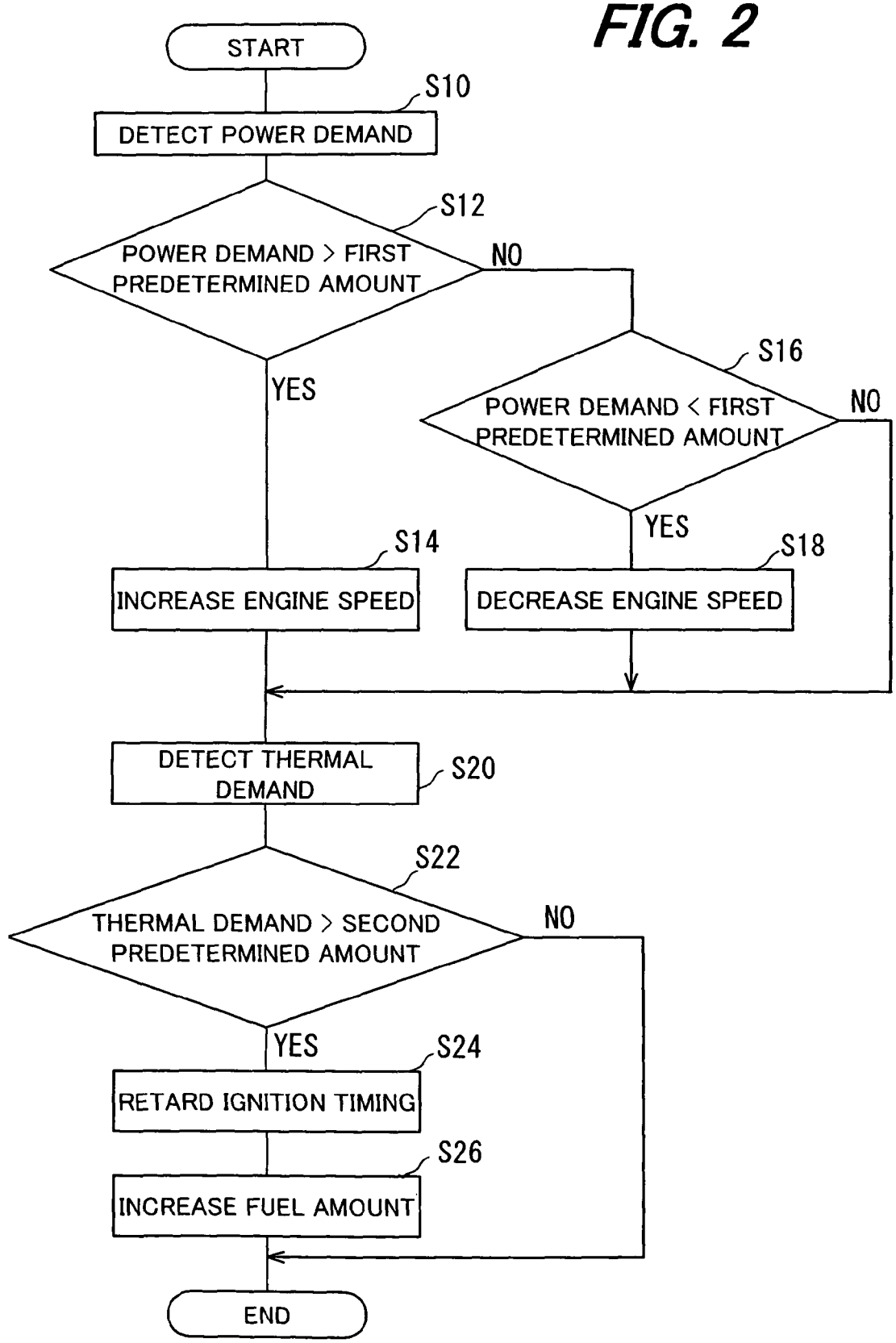
FIG. 2 is a flowchart of the operation of an ECU shown in FIG. 1.

FIG. 2 is a flowchart of the operation of the ECU 32. The illustrated program is executed at predetermined interval, e.g., 100 milliseconds.

In S10, the electric power demand of the electrical load 14 is detected and in S12, it is determined whether the detected power demand is greater than a first predetermined amount. The first predetermined amount indicates a present output power of the generator 20 and an initial value thereof indicates rated power of the generator 20, specifically 1.0 kW.

When the result in S12 is Yes, i.e., it is discriminated that the relatively large power demand exceeds the output power of the generator 20 and hence the power is insufficient, the program proceeds to S14, in which the throttle motor 22g is controlled to drive the throttle valve in the opening direction, thereby increasing the engine speed NE. Owing to this processing, the power generation by the generator 20 increases and it makes possible to supply power enough to satisfy the power demand of the electrical load 14. The thermal output of the engine 22 is also increased with increasing engine speed NE in S14.

On the other hand, when the result in S12 is No, the program proceeds to S16, in which it is determined whether the power demand is less than the first predetermined amount. When the result in S16 is Yes, i.e., it is discriminated that the power demand is lower than the output power of the generator (the power demand is relatively small) and hence surplus electricity is generated, the program proceeds to S18, in which the throttle motor 22g is controlled to drive the throttle valve in the closing direction, thereby decreasing the engine speed NE.

It leads to decrease in the power generation by the generator 20 so that generation of the surplus electricity can be suppressed. The thermal output of the engine 22 is also decreased with decreasing engine speed NE in S18.

When the result in S16 is No, since it means that the power demand is well-balanced with the output power of the generator 20, the program proceeds to S20 without changing the present output power of the generator 20, i.e., the present engine speed NE.

In S20, the thermal demand of the thermal load (hot water tank 40) is detected and in S22, it is determined whether the detected thermal demand is greater than a second predetermined amount. The second predetermined amount indicates a present thermal output of the cogeneration system 10 (precisely, the engine 22 etc.) and an initial value thereof is a rated thermal output of the cogeneration system 10, specifically 2.8 kW.

The determination of S22 amounts to checking as to whether the present thermal output is insufficient for the thermal demand. Specifically, for instance, in a case where the thermal output is increased by increasing the engine speed NE in S14, if the increased thermal output is still insufficient for the thermal demand, the result of S22 is to be affirmative.

In a case where the thermal output is decreased by decreasing the engine speed NE, if the decreased thermal output does not satisfy (i.e., is insufficient for) the thermal demand, similarly the result of S22 is to be affirmative.

When the result in S22 is Yes, i.e., the thermal demand is relatively large and the thermal output of the engine 22 is insufficient, the program proceeds to S24, in which the ignition device 22k is controlled to retard the ignition timing of the engine 22. Specifically, an amount of exhaust heat is increased by retarding the ignition timing so as to increase the thermal output of the engine 22, thereby raising an amount of heat acquired in the exhaust-heat exchanger 22p.

Next, in S26, the jet-needle motor 22h is controlled to drive the jet needle in the opening direction to increase the gas (fuel) amount. Specifically, although the output of the engine 22 is decreased by retarding the ignition timing in the processing of S24, the decrease can be compensated by increasing the fuel amount to be supplied to the engine 22 in the processing of S26, so that the engine output (engine speed NE) is maintained.

In this case, the thermal output of the engine 22 (precisely, the amount of heat acquired in the cylinder block 22a) is increased in proportion to the increase in the fuel amount. Thus only the thermal output of the engine 22 can be increased without changing the output power of the generator 20, thereby enabling to supply the thermal output sufficient for the relatively large thermal demand.

When the result in S22 is No, since it means that the thermal output of the engine 22 is sufficient for the thermal demand, the steps of S24 and S26 are skipped and the program is terminated.

Figure 3:
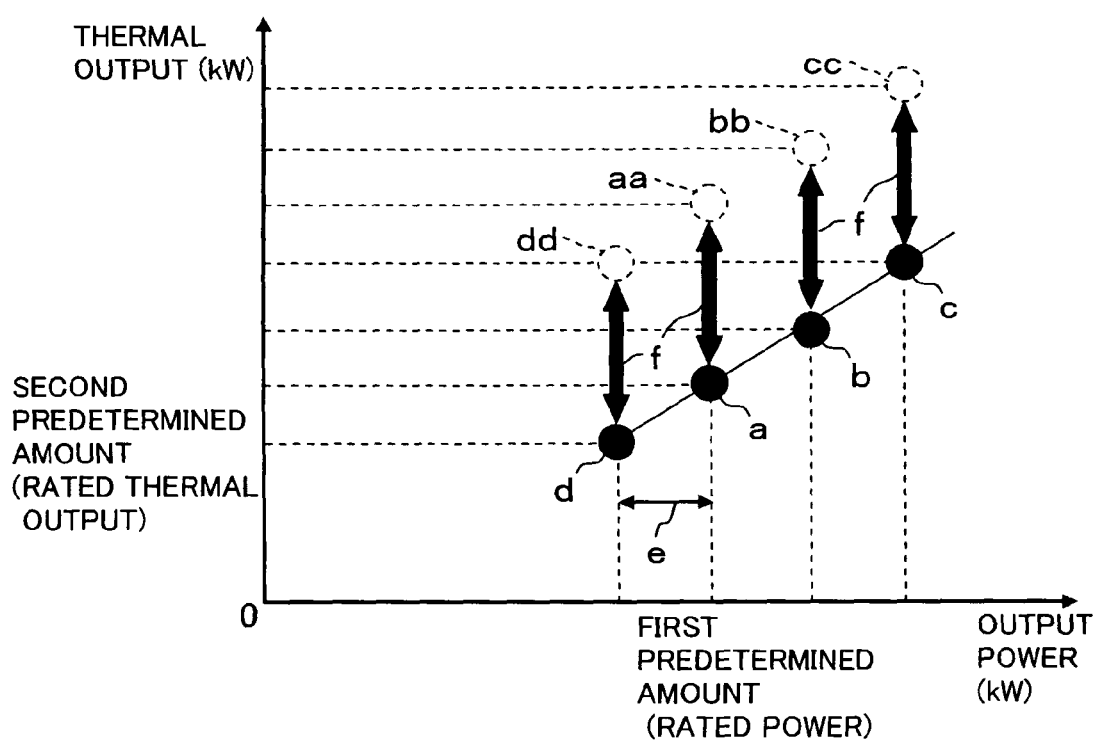
FIG. 3 is a graph for expressing the operating condition of the cogeneration system when the program of the FIG. 2 flowchart is executed.

FIG. 3 is a graph for expressing the operating condition of the cogeneration system 10 when the program of the FIG. 2 flowchart is executed.

In FIG. 3, a reference a designates an initial operating condition of the cogeneration system 10, i.e., a condition where the output power of the generator 20 and the thermal output of the engine 22 are the rated power and rated thermal output, respectively. During the operating condition a, when it is discriminated that the power demand of the electrical load 14 is greater than the first predetermined amount (rated power), i.e., that the power demand is relatively large, and accordingly the engine speed NE is increased (S14), the operation of the cogeneration system 10 shifts to operating conditions indicated by b and c.

As can be seen in FIG. 3, during the operating condition b or c, since the output power of the generator 20 and the thermal output of the engine 22 are increased with increasing engine speed NE, the sufficient power or sufficient thermal output can be supplied for the relatively large power demand or large thermal demand.

When, during the operating condition a, the power demand is discriminated to be lower than the first predetermined amount (i.e., to be relatively small) and accordingly the engine speed NE is decreased (S18), the operation of the cogeneration system 10 shifts to an operating condition d. As a result, since the output power of the generator 20 and the thermal output of the engine 22 are also decreased, generation of the surplus electricity of an amount indicated by e can be suppressed.

In a case where the power demand is well-balanced with the first predetermined amount, the operating condition a is maintained, i.e., the output power of the generator 20 is kept at the rated power without changing the engine speed NE.

During one of the operating conditions a, b, c d of the cogeneration system 10, when it is discriminated that the thermal demand of the thermal load is greater than the second predetermined amount, i.e., the thermal output is insufficient for the thermal demand, and the ignition timing of the engine 22 is retarded (S24), while increasing the gas (fuel) amount (S26), it makes the engine 22 operate such that only its thermal output is increased under the same engine speed NE and the operating conditions a, b, c, d shift to operating conditions aa, bb, cc, dd which are indicated by the dashed lines, respectively.

Specifically, in the cogeneration system 10, since the thermal output can be increased or changed within a range indicated by an arrow f without resulting in the change in the output power of the generator 20, it becomes possible to respond to a case where only the thermal demand increases under constant power demand.

As stated above, the embodiment is configured to have a cogeneration system (10) having a generator (20) adapted to be connectable to an AC power feed line (16) between a commercial power network (12) and an electrical load (14), an internal combustion engine (22) for driving the generator such that exhaust heat of the engine is supplied to a thermal load (hot water tank 40) and an actuator (throttle motor 22g) that opens and closes a throttle valve of the engine, comprising: a power demand detector (current sensor 34d, ECU 32, S10) that detects power demand of the electrical load; a thermal demand detector (coolant temperature sensor 44, ECU 32, S20) that detects thermal demand of the thermal load; an engine speed controller (ECU 32, S12 to S18) that controls operation of the actuator in response to the detected power demand so as to control speed of the engine; and an ignition timing controller (ECU 32, S22 to S24) that controls ignition timing of the engine in response to the detected thermal demand. The method of controlling the cogeneration system 10 is the same as the above.

With this, it becomes possible to control the output power depending on the power demand and control the thermal output depending on the thermal demand, thereby enabling to reduce generation of the surplus electricity or surplus thermal output, specifically to suppress generation of the surplus electricity and thermal output, resulting in improvement of operation efficiency of the entire cogeneration system 10. Further, since generation of the surplus electricity can be suppressed, equipment for consuming surplus electricity, such as a heater as described in the above-mentioned reference is not required (can be removed).

The embodiment is configured such that, the engine speed controller increases the engine speed when the detected power demand is greater than a first predetermined amount (S12, S14), while decreasing the engine speed when the detected power demand is less than the first predetermined amount (S16, S18). The first predetermined amount indicates a present output power of the generator 20, and an initial value of the first predetermined amount indicates a rated power of the generator 20. The method of controlling the cogeneration system 10 is the same as the above.

With this, it becomes possible to control the output power of the generator 20, which is driven by the engine 22, to reliably follow the power demand, thereby effectively suppressing generation of the surplus electricity.

The embodiment is configured such that, the ignition timing controller retards the ignition timing when the detected thermal demand is greater than a second predetermined amount. The second predetermined amount indicates a present thermal output of the cogeneration system 10 and an initial value of the second predetermined amount indicates a rated thermal output of the cogeneration system 10. The method of controlling the cogeneration system 10 is the same as the above.

In other words, it is configured such that, an amount of exhaust heat is increased by retarding the ignition timing. With this, the thermal output of the engine 22 can be increased, thereby enabling to respond to a case where the thermal demand is relatively large.

The embodiment is configured such that, the system further includes: a fuel amount increaser (ECU 32, S22, S24) that increases an amount of fuel to be supplied to the engine 22 when the ignition timing is retarded. The method of controlling the cogeneration system 10 is the same as the above.

Specifically, when the output of the engine 22 decreases by retarding the ignition timing, the decrease is compensated by increasing the fuel amount to maintain the output of the engine 22 (i.e., the engine speed NE). With this, the thermal output of the engine 22 can be increased in proportion to the increase in the fuel amount without resulting in the change in the output power of the generator 20, thereby enabling to respond to a case where only the thermal demand increases with constant thermal demand.

It should be noted that, in the foregoing embodiment, although the thermal demand of the thermal load is detected by transforming the output of the coolant temperature sensor 44 (i.e., the coolant temperature), it can instead be detected or calculated by experimentally preparing a map of thermal demand values corresponding to the outputs of the coolant temperature sensor 44, storing the map in the RAM of the ECU 32, such that the ECU 32 retrieves a value from the map using the output of the coolant temperature sensor 44. Alternatively, a temperature sensor can be installed at the hot water tank (thermal load) 40, thereby detecting the thermal demand based on an output thereof.

It should be noted that, although a gas engine using gas fuel such as the city gas or LP (liquefied petroleum) gas is taken as an example of the power source of the generator 20, the engine can be one utilizing gasoline fuel or the like instead. Also, the rated output of the generator 20, the rated thermal output and displacement of the engine 22 and the like are shown by specific values, but they are only examples and should not be limited thereto.

It should further be noted that, although the AC power outputted from the power source 12 is defined as 100/200 V in the foregoing embodiment, when a power source outputs AC power exceeding 100/200 V, naturally the generation unit 24 outputs voltage corresponding to that power.

Japanese Patent Application No. 2008-034508 filed on Feb. 15, 2008, is incorporated herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. A cogeneration system having a generator adapted to be connectable to an AC power feed line between a commercial power network and an electrical load, an internal combustion engine for driving the generator such that exhaust heat of the engine is supplied to a thermal load and an actuator that opens and closes a throttle valve of the engine, comprising:
a power demand detector that detects power demand of the electrical load;
a thermal demand detector that detects thermal demand of the thermal load;
an engine speed controller that controls operation of the actuator in response to the detected power demand so as to control speed of the engine;
an ignition timing controller that controls ignition timing of the engine in response to the detected thermal demand, wherein the ignition timing controller retards the ignition timing when the detected thermal demand is greater than a second predetermined amount; and
a fuel amount increaser that increases an amount of fuel to be supplied to the engine when the ignition timing is retarded.

2. The system according to claim 1, wherein the engine speed controller increases the engine speed when the detected power demand is greater than a first predetermined amount, while decreasing the engine speed when the detected power demand is less than the first predetermined amount.

3. The system according to claim 2, wherein the first predetermined amount indicates a present output power of the generator.

4. The system according to claim 3, wherein an initial value of the first predetermined amount indicates a rated power of the generator.

5. The system according to claim 1, wherein the second predetermined amount indicates a present thermal output of the cogeneration system.

6. The system according to claim 5, wherein an initial value of the second predetermined amount indicates a rated thermal output of the cogeneration system.

7. A method of controlling cogeneration system having a generator adapted to be connectable to an AC power feed line between a commercial power network and an electrical load, an internal combustion engine for driving the generator such that exhaust heat of the engine is supplied to a thermal load and an actuator that opens and closes a throttle valve of the engine, comprising the steps of:
detecting power demand of the electrical load;
detecting thermal demand of the thermal load;
controlling operation of the actuator in response to the detected power demand so as to control speed of the engine;
controlling ignition timing of the engine in response to the detected thermal demand, wherein the ignition timing is retarded when the detected thermal demand is greater than a second predetermined amount; and increasing an amount of fuel to be supplied to the engine when the ignition timing is retarded.

8. The method according to claim 7, wherein the step of engine speed controlling increases the engine speed when the detected power demand is greater than a first predetermined amount, while decreasing the engine speed when the detected power demand is less than the first predetermined amount.

9. The method according to claim 8, wherein the first predetermined amount indicates a present output power of the generator.

10. The method according to claim 9, wherein an initial value of the first predetermined amount indicates a rated power of the generator.

11. The method according to claim 7, wherein the second predetermined amount indicates a present thermal output of the cogeneration system.

12. The method according to claim 11, wherein an initial value of the second predetermined amount indicates a rated thermal output of the cogeneration system.

* * * * *